United States Patent
Khamker et al.

(10) Patent No.: US 10,466,965 B2
(45) Date of Patent: Nov. 5, 2019

(54) IDENTIFICATION OF USERS ACROSS MULTIPLE PLATFORMS

(71) Applicant: PAYPAL, INC., San Jose, CA (US)

(72) Inventors: Vandit Khamker, San Jose, CA (US); Yang Chen, San Jose, CA (US); Xing Ji, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 430 days.

(21) Appl. No.: 15/439,218

(22) Filed: Feb. 22, 2017

(65) Prior Publication Data
US 2018/0239584 A1    Aug. 23, 2018

(51) Int. Cl.
*G06F 7/02* (2006.01)
*G06F 16/27* (2019.01)
*G06F 16/22* (2019.01)
*G06F 16/33* (2019.01)
*G06F 16/2455* (2019.01)

(52) U.S. Cl.
CPC ............ *G06F 7/02* (2013.01); *G06F 16/2228* (2019.01); *G06F 16/2455* (2019.01); *G06F 16/27* (2019.01); *G06F 16/3343* (2019.01)

(58) Field of Classification Search
CPC ........ G06F 7/02; G06F 16/27; G06F 16/3343; G06F 16/2228; G06F 16/2455
USPC .................. 707/741, 758, 999.003, 999.005
See application file for complete search history.

(56) References Cited

U.S. PATENT DOCUMENTS

| | | | |
|---|---|---|---|
| 7,296,011 B2* | 11/2007 | Chaudhuri | G06F 16/215 |
| 2003/0182282 A1* | 9/2003 | Ripley | G06F 16/2468 |
| 2010/0169343 A1* | 7/2010 | Kenedy | G06F 16/285 |
| | | | 707/758 |
| 2017/0235848 A1* | 8/2017 | Van Dusen | H04L 41/04 |
| | | | 705/12 |

\* cited by examiner

*Primary Examiner* — Dung K Chau
(74) *Attorney, Agent, or Firm* — Haynes and Boone, LLP

(57) ABSTRACT

A computer system creates a plurality of indexes from a first plurality of records, wherein each index corresponds to an attribute of a plurality of attributes. The computer system detects a record of a second plurality of records, wherein the record includes a value corresponding to each of the plurality of attributes. The computer system determines a first set of values from a first index of the plurality of indexes that corresponds to a first attribute. The computer system determines a plurality of individual similarity scores for the first set of values by utilizing a similarity function. The computer system determines an overall similarity score for each record of at least a portion of the first plurality of records and based on the overall similarity scores, determines a record of the first plurality of records that corresponds to the record of the second plurality of records.

20 Claims, 6 Drawing Sheets ns a
record of the first plurality of records that corresponds to the
record of the second plurality of records based on the
determined overall similarity scores.

IDENTIFICATION OF USERS ACROSS MULTIPLE PLATFORMS

TECHNICAL FIELD

The present disclosure relates generally to identification of users, and more particularly to identifying a user account across multiple platforms.

BACKGROUND

In today's day and age, with the popularity of social media and media platforms, users have multiple means of communicating with one another online. However, a user typically does not have to choose one means, but rather communicates across one platform and in another moment, may communicate across another platform. In the same way, with the multitude of online payment platforms available today, a user does not have to choose one, and may often maintain multiple accounts. However, maintaining multiple accounts may require signing into multiple platforms and establishing a separate relationship with the companies that owns each platform. Creating a separate relationship with a company for each platform utilized can be complicated and tedious.

DETAILED DESCRIPTION

Embodiments of the present disclosure provide a system, method, and program product for mapping a user across multiple platforms. A computer system creates a plurality of indexes from a first plurality of records, wherein each index of the plurality of indexes corresponds to an attribute of a plurality of attributes. The computer system detects a record of a second plurality of records, wherein the record includes a value corresponding to each of the plurality of attributes. The computer system determines a first set of values from a first index of the plurality of indexes, the first index corresponding to a first attribute of the plurality of attributes, by utilizing an indexing function to compare each value in the first index to a value in the record corresponding to the first attribute. The computer system determines a plurality of individual similarity scores for the first set of values by utilizing a similarity function to compare each value of the first set of values with a corresponding value of the record of the second plurality of records. The computer system determines an overall similarity score for each record of at least a portion of the first plurality of records based on at least one of the plurality of individual similarity scores for the first set of values. The computer system determines a record of the first plurality of records that corresponds to the record of the second plurality of records based on the determined overall similarity scores.

As stated above, a user may utilized several platforms to perform tasks (such as paying bills online, communicating, etc.). Typically, a user has to maintain an account for each separate platform and establish a relationship with each individual company associated with the platform. Therefore, the fact that the user has a long standing relationship with Company A in utilizing a payments platform of Company A does not have much relevance to a relationship that a user may have with Company B and the payments platform of Company B. If information pertaining to an account of a user with regard to one platform could be mapped to an account of the user with regard to a second platform, the information could be utilized by the second platform in analyzing risk, providing loans, providing credit, and various other tasks. This can additionally be valuable for a company with users associated with two different platforms. Information associated with a user with regard to one platform can be utilized in accessing the user when analyzing risk, providing loans, and such with regard to the other platform.

Embodiments of the present disclosure will now be described in detail with reference to the accompanying Figures.

Figure 1:
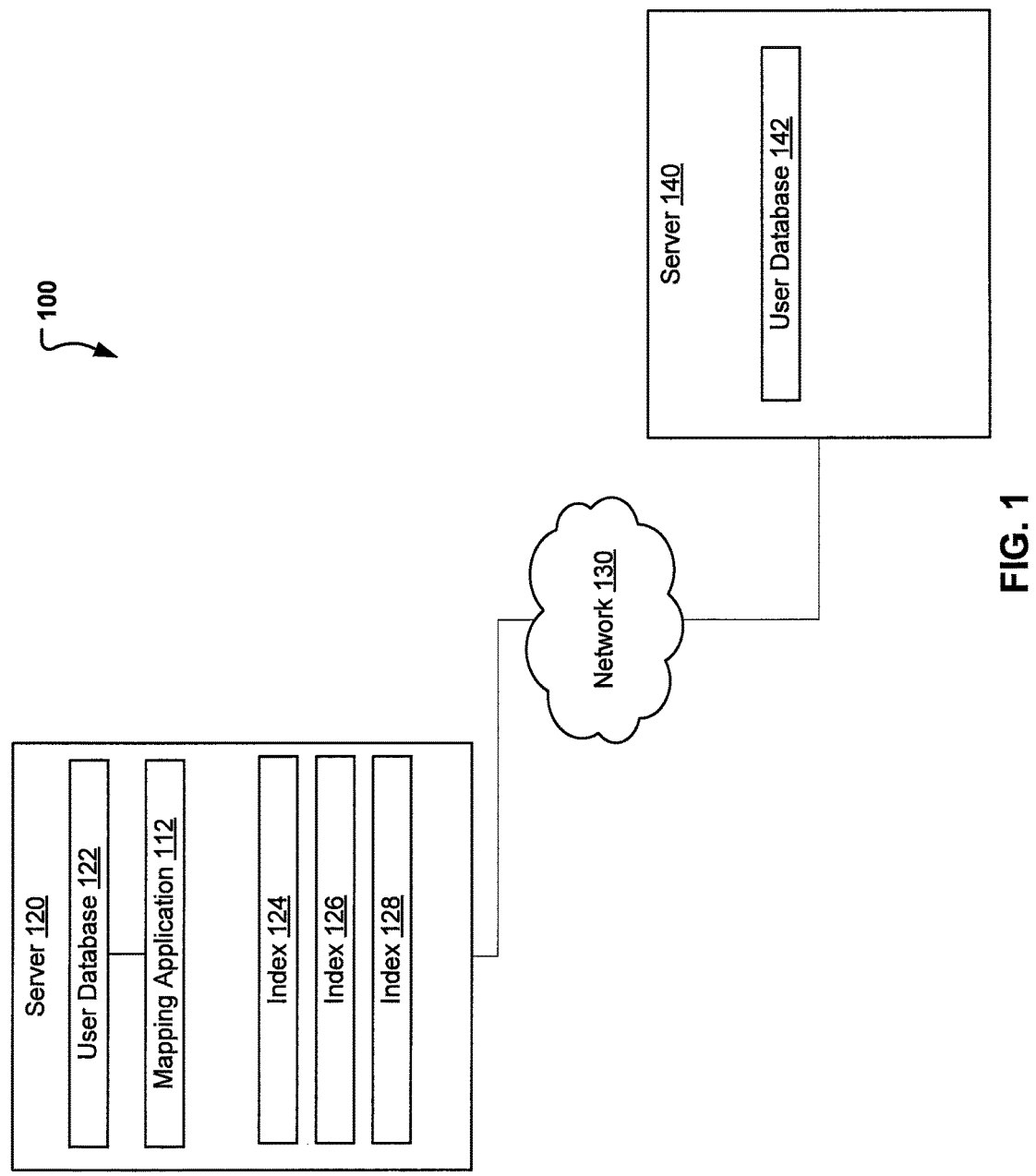
FIG. 1 illustrates a platform mapping system, in accordance with an embodiment.

FIG. 1 illustrates platform mapping system 100, in accordance with an embodiment. In an example embodiment, platform mapping system 100 includes server 120 and server 140 interconnected via network 130.

In the example embodiment, network 130 is the Internet, representing a worldwide collection of networks and gateways to support communications between devices connected to the Internet. Network 130 may include, for example, wired, wireless or fiber optic connections. In other embodiments, network 130 may be implemented as an intranet, a local area network (LAN), or a wide area network (WAN). In general, network 130 can be any combination of connections and protocols that will support communications between server 120 and server 140.

Server 140 includes user database 142. Server 140 may be a desktop computer, a laptop computer, a tablet computer, a handheld device, a smart-phone, a thin client, or any other electronic device or computing system capable of receiving and sending data to and from other computing devices, such as server 120, via network 130. Although not shown, optionally, server 140 can comprise a cluster of servers executing the same software to collectively process requests as distributed by a front-end server and a load balancer. Server 140 is described in more detail with reference to FIG. 6.

In the example embodiment, user database 142 is a database containing entries/records, with each entry/record detailing information about a specific user. In the example embodiment, each piece of information regarding the user is referred to as an attribute of the user. For example, a first name of the user may be a first attribute, a last name a second attribute, and a zip code a third attribute. Furthermore, in the example embodiment, user database 142 is associated with a specific software platform (such as a bill payment, professional networking platform, or social media platform), however, in other embodiments, user database 142 may be associated with multiple software platforms. User database 142 is discussed in more detail with reference to FIGS. 2 and 3.

Server 120 includes mapping application 112, user database 122, index 124, index 126, and index 128. In the example embodiment, server 120 is a computing device capable of receiving and sending data to and from other computing devices, such as server 140, via a network, such as network 130. For example, server 120 may be a desktop computer, a laptop computer, a tablet computer, a handheld device, a smart-phone, a thin client, or any other electronic device or computing system capable of receiving and sending data to and from other computing devices. Although not shown, optionally, server 120 can comprise a cluster of servers executing the same software to collectively process requests as distributed by a front-end server and a load balancer. Server 120 is described in more detail with reference to FIG. 6.

In the example embodiment, user database 122 is a database containing entries/records, with each entry/record detailing information about a specific user. In the example embodiment, each piece of information regarding the user is referred to as an attribute of the user. For example, a first name of the user may be a first attribute, a last name a second attribute, and a zip code a third attribute. Furthermore, in the example embodiment, user database 122 is associated with a specific software application/platform (such as a bill payment application, professional networking website/application, or social media website/application), however, in other embodiments, user database 122 may be associated with multiple software platforms. In the example embodiment, user database 122 and user database 142 are associated with different software applications/platforms. For example, user database 122 may be associated with a first software application/platform, while user database 142 is associated with a second software application/platform. Furthermore, in the example embodiment, user database 122 may be in a different format than user database 142. For example, user database 122 may be in a Structured Query Language Format, while user database 142 is in a DataBase Manager (DBM) format. In other embodiments, user database 122 is in the same format as user database 142. User database 122 is discussed in more detail with reference to FIGS. 2 and 3.

In the example embodiment, the information contained in user database 122 is utilized by mapping application 112 to create index 124, index 126, and index 128. In the example embodiment, index 124, index 126, and index 128 each contain user information corresponding to a specific attribute. For example, index 124 may contain information pertaining to the last name of users associated with user database 122, while index 126 contains information pertaining to zip codes of users associated with user database 122. In addition, while in the example embodiment, index 124, index 126, and index 128 are shown as separate components, in other embodiments, index 124, index 126, and index 128 may be stored within user database 122. Index 124, index 126, and index 128 are described in more detail with reference to FIGS. 2 and 3.

In the example embodiment, mapping application 112 is a program capable of creating index 124, index 126, and index 128 from information contained in user database 122. In addition, mapping application 112 is capable of detecting a record (or multiple records) received from user database 142. Furthermore, mapping application 112 is capable of identifying values associated with specific attributes (such as the last name of a user, etc.) within a record received from user database 142, and determining individual similarity scores by comparing the identified values to values in the created indexes (index 124, index 126, and index 128). Mapping application 112 is also capable of determining an overall similarity score for each record contained in user database 122 with respect to a record received from user database 142, and further capable of identifying a record in user database 122 that corresponds to the record received from user database 142. Mapping application 112 is described in further detail below with reference to FIG. 2 through 5.

While in the example embodiment, mapping application 112 is located on server 120 with user database 122, in other embodiments, mapping application 112 (and index 124, index 126, and index 128) may be located on a separate computing device/server capable of communicating with server 120 via network 130.

Figure 2:
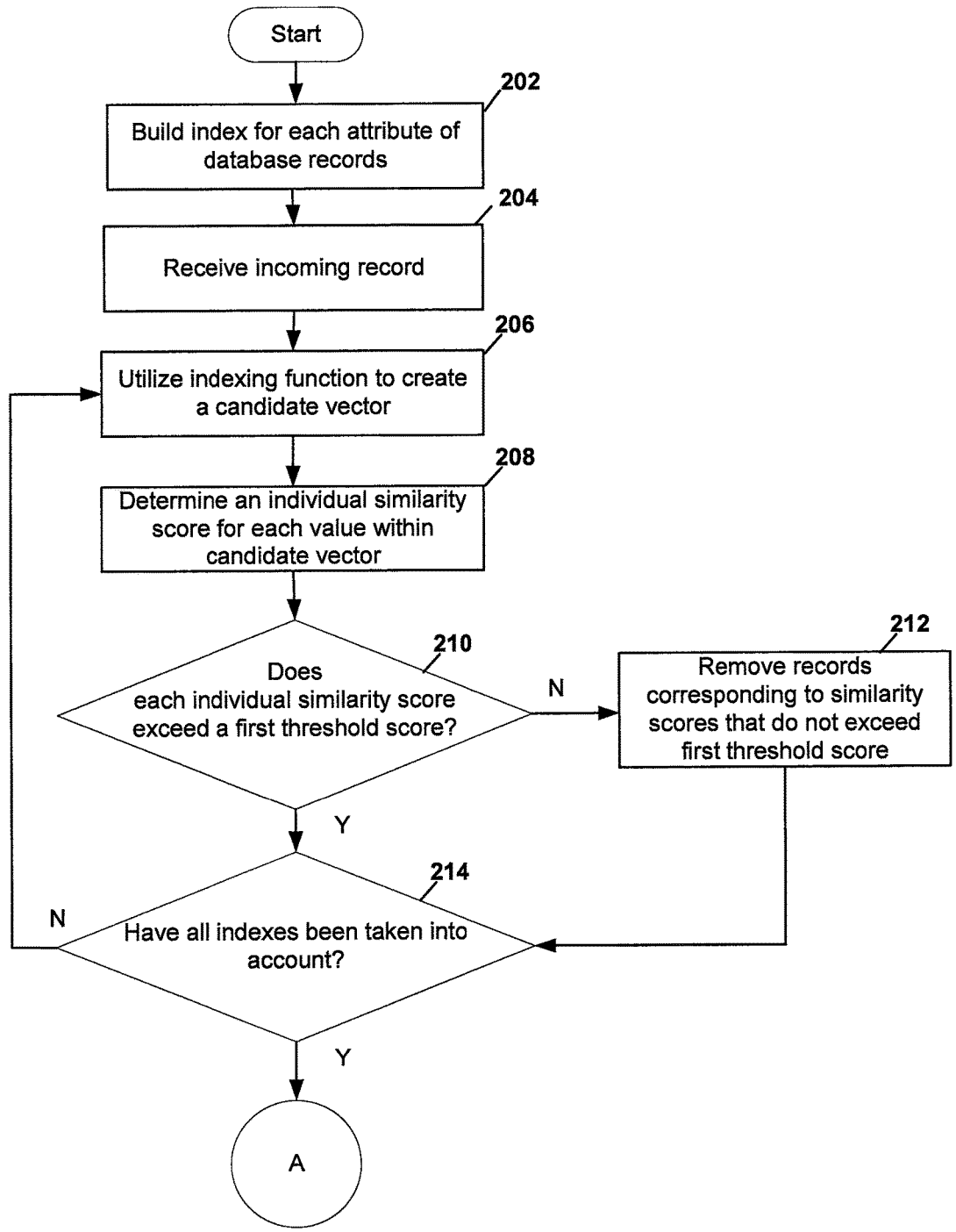
FIGS. 2 and 3 is a flowchart illustrating the operations of the mapping application of FIG. 1 in determining whether a user can be mapped across multiple platforms, in accordance with an embodiment.
Figure 3:
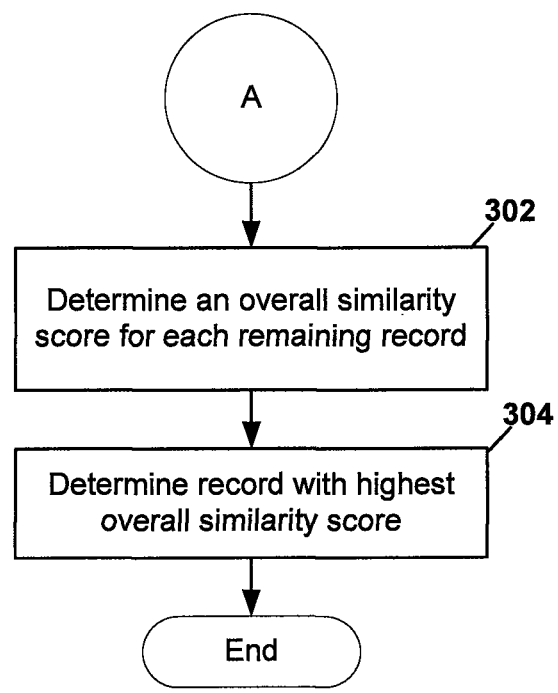

FIGS. 2 and 3 is a flowchart illustrating the operations of mapping application 112 in determining a record within user database 122 that corresponds with an incoming record from user database 142, in accordance with an embodiment.

In the example embodiment, mapping application 112 builds index 124, index 126, and index 128 from the information (records) contained in user database 122 (step 202). In the example embodiment, mapping application 112 extracts information from user database 122 relating to a specific attribute and builds an index corresponding to the specific attribute. For example, mapping application 112 may extract all "last names" from the records in user database 122 and build index 124 using the extracted "last names". Therefore, in this example, the attribute is "last names" and index 124 would contain information pertaining to all "last names" in user database 122 (i.e. each entry in index 124 would correspond to an extracted last name). Furthermore, mapping application 112 may extract all "zip codes" from user database 122 and build index 126 using the extracted "zip codes". While, in the example embodiment, mapping application 112 builds index 124, index 126, and index 128, in other embodiments, mapping application 112 may build a different number of indexes from the information contained in user database 122.

In the example embodiment, mapping application 112 receives a record from user database 142 via network 130 (step 204). In the example embodiment, mapping application 112 identifies specific attributes (and their corresponding values) present within the received record. For example, mapping application 112 may identify a value in the received record corresponding to a first attribute (last name). In the example embodiment, one or more identifiers are present within the record that denote the attribute each value corresponds to. In another embodiment, mapping application 112 may utilize natural language processing techniques to determine which attribute a specific value corresponds to.

In other embodiments, mapping application 112 may detect reception of a record from user database 142 by server 120, or alternatively, mapping application 112 may communicate via network 130 with user database 142 in order to extract portions, such as attribute designations (and their corresponding values) present within a specific record(s).

Mapping application 112 utilizes an indexing function to create a candidate vector for index 124 (step 206). In the example embodiment, mapping application 112 determines an indexing function based on the attribute associated with the index. For example, mapping application 112 may determine to use a Soundex, NYSIIS, or another phonetic function if the attribute associated with index 124 is a "last name" or first name". Additionally, mapping application 112 may determine to use a geolocation function, such as an R-tree function, if the attribute associated with index 124 are geographical coordinates or alternative geolocation information. Furthermore, mapping application 112 may determine to use a B-tree function if the attribute associated with index 124 is a "zip code", "phone number", "social security number", or another numeric field. In the example embodiment, mapping application 112 may reference a database of indexing functions and corresponding attributes in order to determine the appropriate indexing function to utilize for a given attribute.

In the example embodiment, mapping application 112 utilizes the determined indexing function to create a candidate vector for index 124. For example, if index 124 is associated with the attribute "last name", and the incoming record contained a value of "Smith" corresponding to the attribute "last name", mapping application 112 may utilize a Soundex function to compare the value "Smith" to each of the values in index 124 in order to create a candidate vector. In this example, since a phonetic function (Soundex) is being utilized, the indexing function would compare the value "Smith" to each value in index 124 and determine the values within index 124 that phonetically sound like "Smith". For example, the values may include "Smith" and "Smyth" since both values sound phonetically similar to the value in the received record ("Smith"), but may exclude values such as "Miller". These determined values would comprise the candidate vector. The creation of the candidate vector is illustrated in further detail with regard to FIGS. 4 and 5.

Mapping application 112 determines an individual similarity score for each value in the created candidate vector (step 208). In the example embodiment, mapping application 112 determines a similarity function to utilize based on the attribute associated with the created candidate vector. For example, if the values in the candidate vector associated with the attribute are expressed as a vector, such as a series of alphabetic, numerical, alphanumerical, or geolocation coordinates, mapping application 112 may determine to utilize a cosine similarity function. For example, if mapping application 112 is determining an individual similarity score for the value "Smyth" in the candidate vector with regard to a value "Smith" in the received record, mapping application 112 may utilize a cosine similarity function due to the values being able to be expressed in a vector of alphabetic characters. In another example, if the values in the candidate vector associated with the attribute are expressed in sets of data, such as sets of items bought by a user, or sets of items liked by a user on social media, mapping application 112 may determine to utilize a Jaccard similarity function. Additionally, mapping application 112 may alternatively utilize other similarity functions, such as an edit distance function, based on the attribute associated with the values being compared. In the example embodiment, mapping application 112 may reference a database of similarity functions and corresponding attributes in order to determine the appropriate similarity function to utilize for a given attribute.

Mapping application 112 determines whether each determined similarity score exceeds a first threshold score (decision 210). For example, in the example embodiment, the first threshold score may be 0.2, however, in other embodiments, the threshold score may be another value. In addition, in other embodiments, different threshold scores may be utilized based on the similarity function used by mapping application 112. For example, one threshold score may apply for comparisons performed by utilizing a cosine similarity function, and another threshold score may apply for comparisons performed by utilizing a Jaccard similarity function.

If each determined similarity score does not exceed the first threshold score (decision 210, "NO" branch), mapping application 112 removes the records associated with user database 122 corresponding to the determined similarity score from the created indexes (step 212). For example, if mapping application creates index 124 utilizing record 1 and record 2 from user database 122, and utilizes a similarity function to compare a value of index 124 corresponding to record 1 to a corresponding value of the incoming record from user database 142, if mapping application 112 determines that the determined similarity score does not exceed the first threshold score, mapping application 112 removes all values associated from record 1 from all created indexes corresponding to user database 122. In other embodiments, mapping application 112 may, rather than removing all values associated with record 1 from all created indexes, create a designation or indication next to each value associated with record 1 within each index so that mapping application 112 does not consider the values when calculating individual similarity scores for subsequent indexes (such as index 126 and index 128).

If each determined similarity score does exceed the first threshold score (decision 210, "YES" branch), mapping application 112 determines whether all indexes have been taken into account (decision 214). If mapping application 112 determines that all the indexes built from user database 122 have not been taken into account (decision 214, "NO" branch"), mapping application 112 moves back to step 206 (determines an indexing function and utilizes the indexing function to create a candidate vector for the next index). In the example embodiment, where mapping application 112 creates index 124, 126, and 128, mapping application repeats steps 206 to 214 for index 126 and index 128. For example, mapping application 112 determines a candidate vector from values of index 126 by utilizing an indexing function in the same manner as described above. However, mapping application 112 does not take any values of index 126 into account that are associated with records that have been removed (in step 212). Therefore, referring to the example above, mapping application 112 does not take any values of index 126 associated with record 1 into account when determining a candidate vector. Mapping application 112 then determines a similarity score for each value of the candidate vector (determined for index 126) and further determines whether the similarity score for each value of the candidate vector exceeds the first threshold score. If mapping application 112 determines that a similarity score associated with any of the values in the candidate vector do not exceed the first threshold score, the underlying record of user database 122 associated with the value of the candidate vector is removed (or an indication is provided) in a similar manner as described above. The process (step 206 to 214) is then repeated once again with respect to index 128.

If mapping application 112 determines that all the indexes built from user database 122 have been taken into account (decision 214, "YES" branch), mapping application 112 determines an overall similarity score for each remaining record of user database 122 (step 302). In the example embodiment, mapping application 112 determines an overall similarity score based on the individual similarity scores associated with each value of the record. For example, if record 2 includes a first value corresponding to index 124, a second value corresponding to index 126, and a third value corresponding to index 128, mapping application 112 determines an overall similarity score for record 2 based on the individual similarity scores determined for each of the 3 values. Furthermore, in the example embodiment a weight is associated with each of the individual similarity scores based on the corresponding attribute. In the example embodiment, mapping application 112 determines which weight to associate with a specific individual similarity score by referencing a database containing attributes and corresponding weights. In the example embodiment, the information in the database is input by a user or developer based on the importance of attribute. For example, a higher weight may be associated with an "address" attribute versus a "first name" attribute due to the fact that many people may share the same first name, but it is rare that people share the same address. Therefore, in this example, the individual similarity score associated with the "address" value would be assigned a higher weight than the individual similarity score associated with the "first name" value, would therefore influence the overall similarity score of the underlying record to a higher degree than the individual similarity score associated with the "first name" value.

In other embodiments, mapping application 112 may utilize machine learning techniques to identify the weight to associate with each attribute. For example, mapping application 112 may analyze historical data in order to determine which attributes are the best indicators for determining which accounts correspond to the same user.

Mapping application 112 determines the record from user database 122 that has the highest overall similarity score (step 304). In the example embodiment, mapping application 112 compares all calculated overall similarity scores for the remaining records and determines the highest overall similarity score. Through this determination, mapping application 112 determines which record from user database 122 most closely matches the record received from user database 142. In the example embodiment, the determined record from user database 122 is associated with the record received from user database 142 in a determined match database. Furthermore, in the example embodiment, if mapping application 112 determines that the overall similarity score for the determined record from user database 122 (the highest overall similarity score) does not exceed an overall threshold score, mapping application 112 does not associate the determined record from user database 122 with the record received from user database 142, and further indicates in the determined match database that no match was found for the received record. In the example embodiment, the overall threshold score may be determined by a developer.

The determined match database can be utilized or referenced to identify associations between records in user database 122 and user database 142. Since the determined match database includes records from user database 122 that have been mapped to corresponding records in user database 142, subsequently referencing the database to identify a record in user database 142 that corresponds to a record in user database 122, or vice versa, can save a substantial amount of time. For example, the owner or administrator of database 142 may make a call requesting to perform a lookup within the determined match database to determine if a record within user database 122 has been mapped to a specific record in user database 142. If a mapped record exists within the determined match database, significant time may be saved. If a mapped record does not exist, the process detailed above may be performed to identify a record within user database 122 that matches the specific record in user database 142.

In one embodiment, where user database 122 and user database 142 are in different database formats or if one database is owned by a third party, an application programming interface may be built so that communication can be conducted between the party and the third party (each having ownership of a database). As discussed above, once the records are mapped (an association has been created), information associated with a user record (or account) corresponding to a third party (Company B) can be utilized by another party (Company A) to evaluate the user.

Furthermore, in one embodiment, while an attribute may correspond to "last names" or "zip code", an attribute may also correspond to a series of transactions. For example, index 124 may include multiple series of transactions with each series of transactions corresponding to a record (associated with a user). Mapping application 112 may compare each series of transactions to a series of transactions corresponding to the received record, and further determine individual similarity scores for each of the series of transactions as described above.

Figure 4:
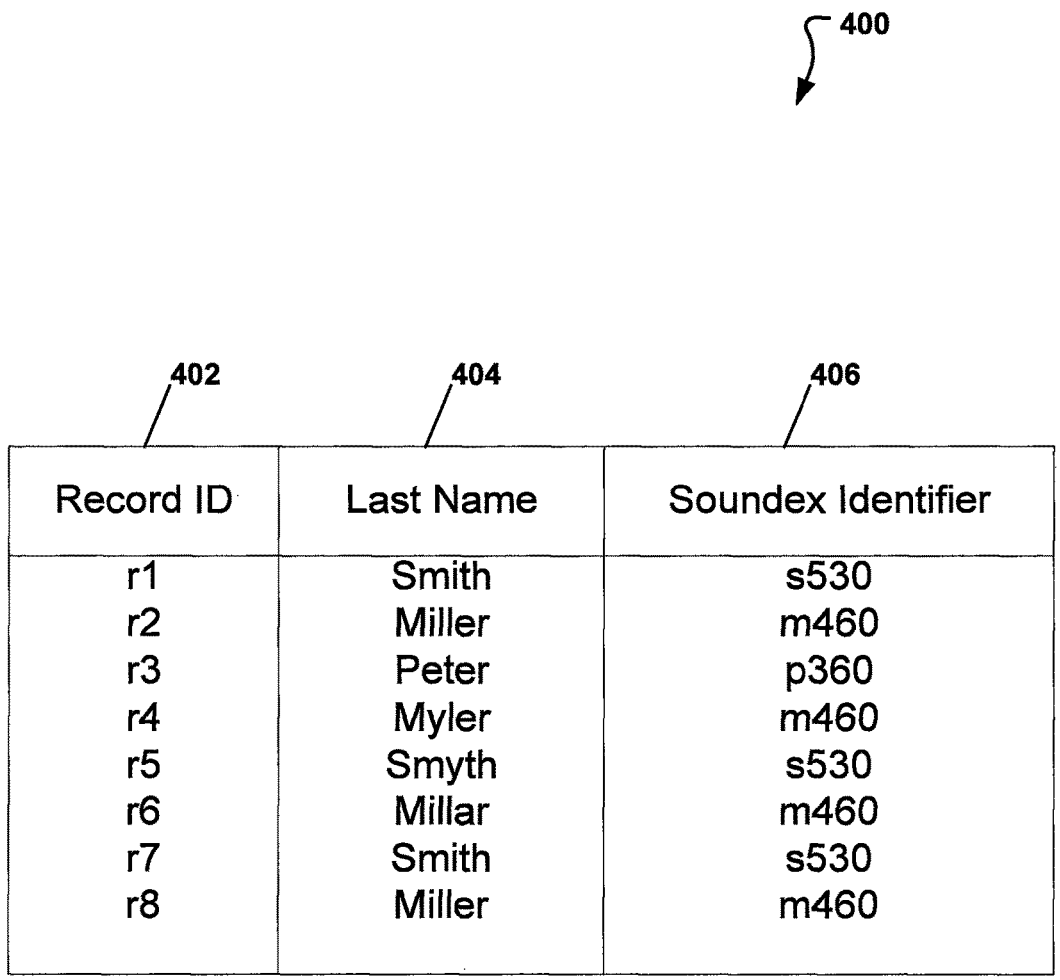
FIG. 4 is a depiction illustrating an index built by mapping application 112 corresponding to a last name attribute, in accordance with an embodiment.

FIG. 4 is a depiction illustrating an index built by mapping application 112 corresponding to a last name attribute, in accordance with an embodiment. In the example embodiment, index 400 corresponds to a "last name" attribute. Mapping application 112 extracts all last name information from the records of user database 122 and builds index 400 that includes a record identifier 402 and the corresponding attribute value 404, here a last name corresponding to the record. Furthermore, in the example embodiment, the index includes an indexing identifier 406 determined based on utilizing the indexing function (here Soundex function) to determine a candidate vector. As depicted, the last names that sound phonetically similar correspond to the same indexing identifier 406.

Figure 5:
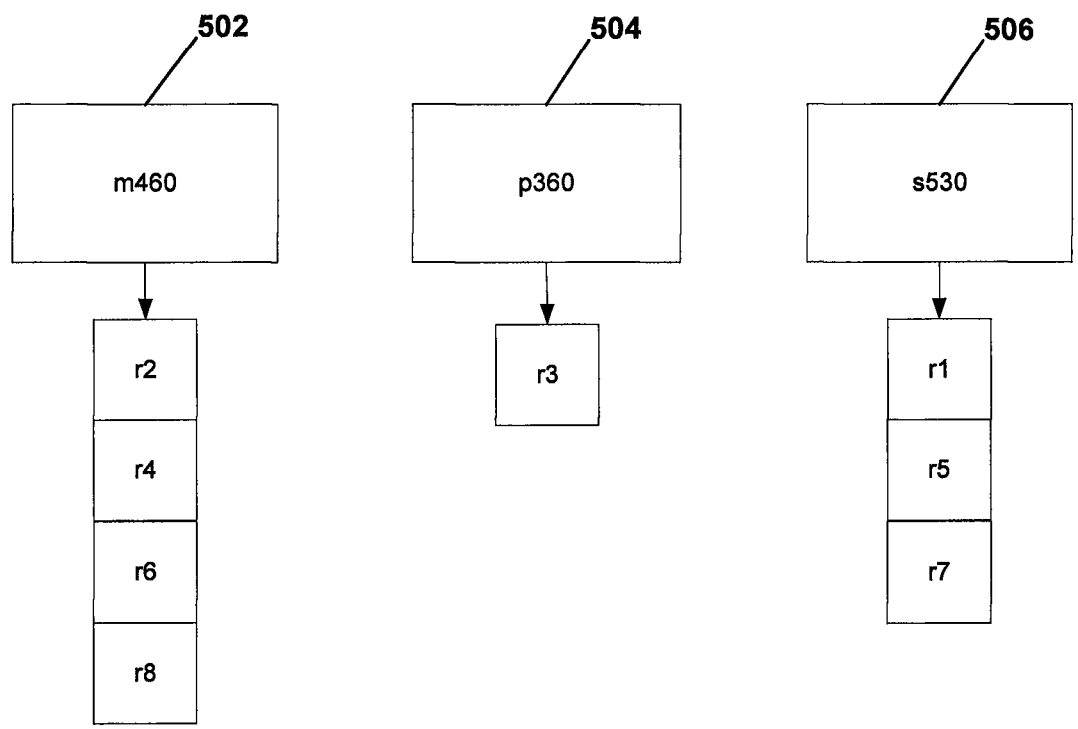
FIG. 5 is a depiction illustrating a candidate vector created from the index built in FIG. 4, in accordance with an embodiment.

FIG. 5 is a depiction illustrating a group of candidate vectors created from the index built in FIG. 4, in accordance with an embodiment. In the example embodiment, mapping application 112 utilizes the indexing function, determined based on the attribute corresponding to the index, to create the candidate vectors. The figure depicts three separate candidate vectors (502, 504, and 506) created from index 400 by utilizing a Soundex indexing function. As stated above, Soundex is a phonetic function that can be utilized to create candidate vectors from an index based on grouping values that sound phonetically similar. Candidate vector 502 corresponds to the values "Miller", "Myler", and "Millar" since they are all phonetically similar. Candidate vector 504 corresponds to the value "Peter", and candidate vector 506 corresponds to the value "Smith" and "Smyth".

The foregoing description of various embodiments of the present disclosure has been presented for purposes of illustration and description. It is not intended to be exhaustive nor to limit the disclosure to the precise form disclosed. Many modifications and variations are possible. Such modifications and variations that may be apparent to a person skilled in the art of the disclosure are intended to be included within the scope of the disclosure as defined by the accompanying claims.

Figure 6:
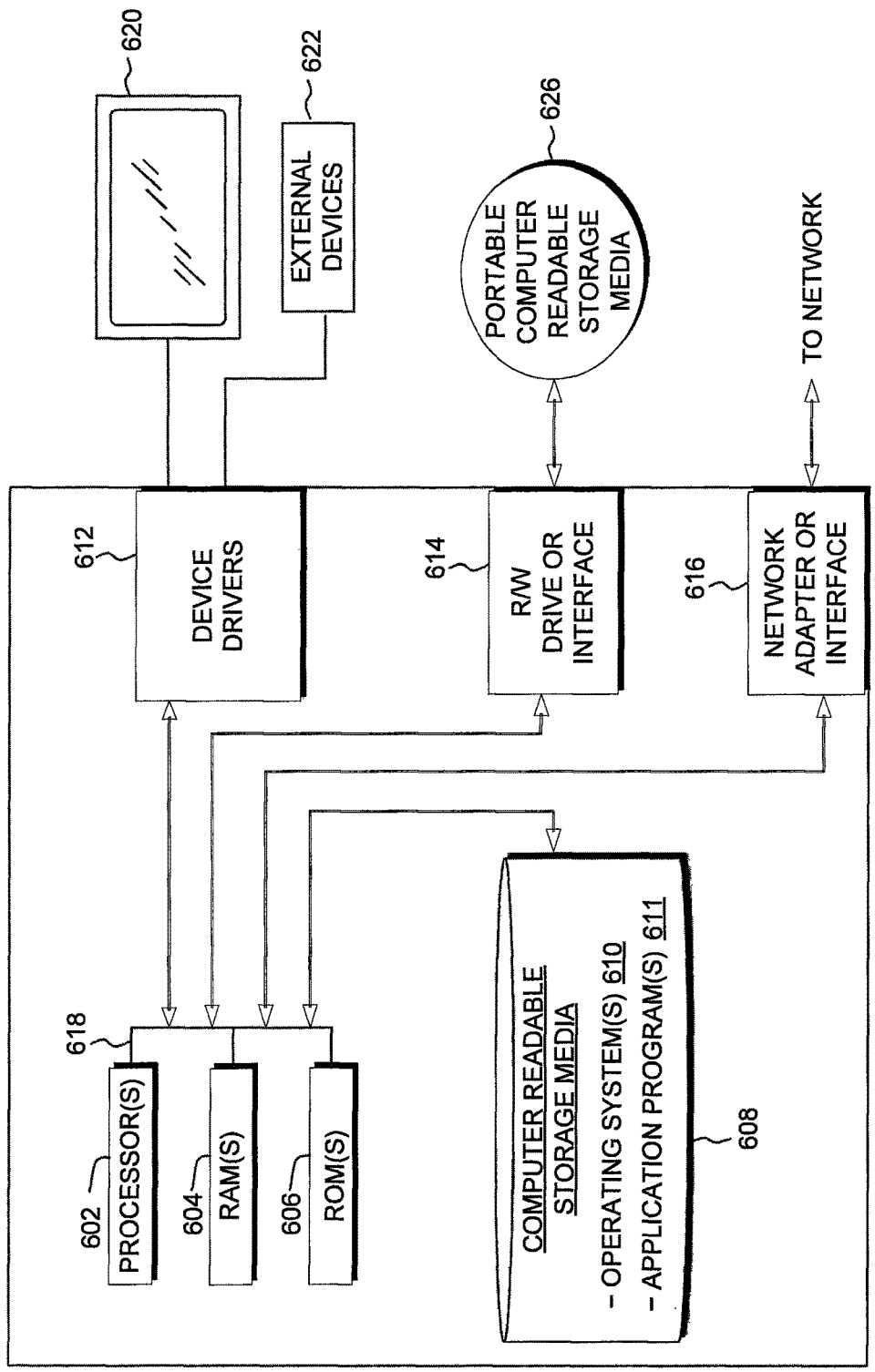
FIG. 6 is a block diagram depicting the hardware components of the platform mapping system of FIG. 1, in accordance with an embodiment.

FIG. 6 depicts a block diagram of components of computing devices contained in platform mapping system 100 of FIG. 1, in accordance with an embodiment. It should be appreciated that FIG. 6 provides only an illustration of one implementation and does not imply any limitations with regard to the environments in which different embodiments may be implemented. Many modifications to the depicted environment may be made.

Computing devices may include one or more processors 602, one or more computer-readable RAMs 604, one or more computer-readable ROMs 606, one or more computer readable storage media 608, device drivers 612, read/write drive or interface 614, network adapter or interface 616, all interconnected over a communications fabric 618. Communications fabric 618 may be implemented with any architecture designed for passing data and/or control information between processors (such as microprocessors, communications and network processors, etc.), system memory, peripheral devices, and any other hardware components within a system.

One or more operating systems 610, and one or more application programs 611, for example, mapping application 112, are stored on one or more of the computer readable storage media 608 for execution by one or more of the processors 602 via one or more of the respective RAMs 604 (which typically include cache memory). In the illustrated embodiment, each of the computer readable storage media 608 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Computing devices may also include a R/W drive or interface 614 to read from and write to one or more portable computer readable storage media 626. Application programs 611 on the computing devices may be stored on one or more of the portable computer readable storage media 626, read via the respective R/W drive or interface 614 and loaded into the respective computer readable storage media 608.

Computing devices may also include a network adapter or interface 616, such as a TCP/IP adapter card or wireless communication adapter (such as a 4G wireless communication adapter using OFDMA technology). Application programs 611 on the computing devices may be downloaded to the computing devices from an external computer or external storage device via a network (for example, the Internet, a local area network or other wide area network or wireless network) and network adapter or interface 616. From the network adapter or interface 616, the programs may be loaded onto computer readable storage media 608. The network may comprise copper wires, optical fibers, wireless transmission, routers, firewalls, switches, gateway computers and/or edge servers.

Computing devices may also include a display screen 620, and external devices 622, which may include, for example a keyboard, a computer mouse and/or touchpad. Device drivers 612 interface to display screen 620 for imaging, to external devices 622, and/or to display screen 620 for pressure sensing of alphanumeric character entry and user selections. The device drivers 612, R/W drive or interface 614 and network adapter or interface 616 may comprise hardware and software (stored on computer readable storage media 608 and/or ROM 606).

The programs described herein are identified based upon the application for which they are implemented in a specific embodiment. However, it should be appreciated that any particular program nomenclature herein is used merely for convenience, and thus the disclosure should not be limited to use solely in any specific application identified and/or implied by such nomenclature.

Based on the foregoing, a computer system, method, and computer program product have been disclosed. However, numerous modifications and substitutions can be made without deviating from the scope of the present disclosure. Therefore, the various embodiments have been disclosed by way of example and not limitation.

Various embodiments of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A system, comprising:
   one or more processors and one or more computer-readable memories, the one or more processors configured to execute the program instructions via at least one of the one or more computer-readable memories to cause the system to perform the operations comprising:
   creating a plurality of indexes from a first plurality of records, wherein each index of the plurality of indexes corresponds to an attribute of a plurality of attributes;
   detecting a record of a second plurality of records, wherein the record includes a value corresponding to each of the plurality of attributes;
   determining a first set of values from a first index of the plurality of indexes, the first index corresponding to a first attribute of the plurality of attributes, by utilizing an indexing function to compare each value in the first index to a value in the record corresponding to the first attribute;
   determining a plurality of individual similarity scores for the first set of values by utilizing a similarity function to compare each value of the first set of values with a corresponding value of the record of the second plurality of records;
   determining an overall similarity score for each record of at least a portion of the first plurality of records based on at least one of the plurality of individual similarity scores for the first set of values; and
   determining a record of the first plurality of records that corresponds to the record of the second plurality of records based on the determined overall similarity scores.

2. The system of claim 1, the operations further comprising:
   based on determining that an individual similarity score for a first value of the first set of values does not exceed a first threshold score, providing an indication that an overall similarity score for a first record of the first plurality of records that corresponds to the first value is not to be calculated; and
   wherein the first record of the first plurality of records is not included in the at least portion of the first plurality of records.

3. The system of claim 1, the operations further comprising determining to utilize the indexing function for the first index based on cross-referencing the first attribute with a database containing one or more attributes and one or more corresponding indexing functions.

4. The system of claim 1, the operations further comprising:
   determining a second set of values from a second index of the plurality of indexes, the second index corresponding to a second attribute of the plurality of attributes, by utilizing a second indexing function to compare each value in the second index to a value in the record corresponding to the second attribute;
   determining a plurality of individual similarity scores for the second set of values by utilizing a second similarity function to compare each value of the second set of values with a corresponding value of the record of the second plurality of records; and
   wherein the determining the overall similarity score for each record of the at least a portion of the first plurality of records is further based on at least one of the plurality of individual similarity scores for the second set of values.

5. The system of claim 1, further comprising:
   based on determining that an overall similarity score associated with the record of the first plurality of records does not exceed an overall threshold score, providing an indication that a record from the first plurality of records that corresponds to the record of the second plurality of records was not found.

6. The system of claim 1, further comprising:
based on determining that an overall similarity score associated with the record of the first plurality of records exceeds an overall threshold score, creating an association between the determined record of the first plurality of records and the record of the second plurality of records.

7. The system of claim 1, wherein the first plurality of records are in a first database format and the second plurality of records are in a second database format.

8. A method comprising:
creating a first index and a second index from a first plurality of records, wherein the first index corresponds to a first attribute and the second index corresponds to a second attribute;
detecting a record of a second plurality of records, wherein the record includes a first value corresponding to the first attribute and a second value corresponding to the second attribute;
determining a first set of values from the first index by utilizing a first indexing function to compare each value in the first index to the first value in the record of the second plurality of records;
determining a first plurality of individual similarity scores for the first set of values by utilizing a first similarity function to compare each value of the first set of values with the first value of the second plurality of records;
determining a second set of values from the second index by utilizing a second indexing function to compare each value in the second index to the second value in the record of the second plurality of records;
determining a second plurality of individual similarity scores for the second set of values by utilizing a second similarity function to compare each value of the second set of values with the second value of the second plurality of records;
determining an overall similarity score for each record of the first plurality of records based on at least one of the first plurality of individual similarity scores and at least one of the second plurality of individual similarity scores; and
determining a record of the first plurality of records that corresponds to the record of the second plurality of records based on the determined overall similarity scores.

9. The method of claim 8, the operations further comprising:
based on determining that an individual similarity score for a first value of the first set of values does not exceed a first threshold score, providing an indication that an overall similarity score for a first record of the first plurality of records that corresponds to the first value is not to be calculated; and
wherein the first record of the first plurality of records is not included in the at least portion of the first plurality of records.

10. The method of claim 8, the operations further comprising determining to utilize the first indexing function for the first index based on cross-referencing the first attribute with a database containing one or more attributes and one or more corresponding indexing functions.

11. The method of claim 8, wherein the determining the overall similarity score for each record of the first plurality of records further comprises determining a first weight value that corresponds with the first plurality of individual similarity scores and a second weight value that corresponds with the second plurality of individual similarity scores by cross-referencing a database containing one or more weight values and one or more corresponding attributes.

12. The method of claim 8, further comprising:
based on determining that an overall similarity score associated with the record of the first plurality of records does not exceed an overall threshold score, providing an indication that a record from the first plurality of records that corresponds to the record of the second plurality of records was not found.

13. The method of claim 8, further comprising:
based on determining that an overall similarity score associated with the record of the first plurality of records exceeds an overall threshold score, creating an association between the determined record of the first plurality of records and the record of the second plurality of records.

14. The method of claim 8, wherein the first plurality of records are in a first database format and the second plurality of records are in a second database format.

15. A computer program product, comprising:
one or more computer-readable tangible storage devices, and program instructions stored on at least one of the one or more storage devices, the program instructions when executed cause a machine to perform operations comprising:
creating a plurality of indexes from a first plurality of records, wherein each index of the plurality of indexes corresponds to an attribute of a plurality of attributes;
detecting a record of a second plurality of records, wherein the record includes a value corresponding to each of the plurality of attributes;
determining a first set of values from a first index of the plurality of indexes, the first index corresponding to a first attribute of the plurality of attributes, by utilizing an indexing function to compare each value in the first index to a value in the record corresponding to the first attribute;
determining a plurality of individual similarity scores for the first set of values by utilizing a similarity function to compare each value of the first set of values with a corresponding value of the record of the second plurality of records;
determining an overall similarity score for each record of at least a portion of the first plurality of records based on at least one of the plurality of individual similarity scores for the first set of values; and
determining a record of the first plurality of records that corresponds to the record of the second plurality of records based on the determined overall similarity scores.

16. The computer program product of claim 15, the operations further comprising:
based on determining that an individual similarity score for a first value of the first set of values does not exceed a first threshold score, providing an indication that an overall similarity score for a first record of the first plurality of records that corresponds to the first value is not to be calculated; and
wherein the first record of the first plurality of records is not included in the at least portion of the first plurality of records.

17. The computer program product of claim 15, the operations further comprising determining to utilize the indexing function for the first index based on cross-referencing the first attribute with a database containing one or more attributes and one or more corresponding indexing functions.

18. The computer program product of claim 15, the operations further comprising:
   determining a second set of values from a second index of the plurality of indexes, the second index corresponding to a second attribute of the plurality of attributes, by utilizing a second indexing function to compare each value in the second index to a value in the record corresponding to the second attribute;
   determining a plurality of individual similarity scores for the second set of values by utilizing a second similarity function to compare each value of the second set of values with a corresponding value of the record of the second plurality of records; and
   wherein the determining the overall similarity score for each record of the at least a portion of the first plurality of records is further based on at least one of the plurality of individual similarity scores for the second set of values.

19. The computer program product of claim 15, further comprising:
   based on determining that an overall similarity score associated with the record of the first plurality of records does not exceed an overall threshold score, providing an indication that a record from the first plurality of records that corresponds to the record of the second plurality of records was not found.

20. The computer program product of claim 15, further comprising:
   based on determining that an overall similarity score associated with the record of the first plurality of records exceeds an overall threshold score, creating an association between the determined record of the first plurality of records and the record of the second plurality of records.

* * * * *